United States Patent [19]

Deacon et al.

[11] Patent Number: 4,711,752

[45] Date of Patent: Dec. 8, 1987

[54] METHOD AND APPARATUS FOR MOLDING FIBER OPTIC CONNECTOR FERRULE

[75] Inventors: George R. Deacon, Corona Del Mar; William R. Cranford, Irvine, both of Calif.

[73] Assignee: ITT Corporation, New York, N.Y.

[21] Appl. No.: 623,301

[22] Filed: Jun. 22, 1984

[51] Int. Cl.⁴ ............................................. B29C 45/36
[52] U.S. Cl. ............................ 264/328.12; 249/142; 249/151; 249/177; 264/1.5; 264/318; 425/468; 425/577; 425/543
[58] Field of Search .................... 264/1.5, 318, 328.12; 249/151, 142, 177; 425/468, 808, 249, 577

[56] References Cited

U.S. PATENT DOCUMENTS

| | | | |
|---|---|---|---|
| 3,374,503 | 3/1968 | Boniger | 425/468 |
| 3,374,538 | 3/1968 | Murray | 264/275 |
| 4,187,272 | 2/1980 | Bourdon et al. | 264/318 |
| 4,213,932 | 7/1980 | Young | 264/1.5 |
| 4,303,304 | 12/1981 | Ruiz | 264/1.5 |
| 4,424,174 | 1/1984 | Howarth | 264/1.5 |
| 4,493,632 | 1/1985 | Hori et al. | 425/468 |

FOREIGN PATENT DOCUMENTS 109010 6/1984 Japan ..................... 264/1.5

Primary Examiner—James Lowe
Attorney, Agent, or Firm—T. L. Peterson

[57] ABSTRACT

An apparatus is provided for use in molding a ferrule which must hold an optical fiber cable so the optical fiber lies precisely concentric with the cylindrical outside surface of the forward portion of the ferrule. A corepin which lies within a mold to form a ferrule cavity between them, has a rearward end held to the mold and a forward end which must be held precisely concentric with the inside surface of the ferrule cavity. A bushing of clover leaf design is positioned in the mold cavity, and has three radially-extending arms that precisely center the forward end of the corepin, while leaving spaces between the arms through which plastic can flow during the molding of the ferrule. The radially-outer arms of the bushing are tied by tying portions whose radially inside surfaces form an interrupted cylindrical outside surface of the ferrule.

7 Claims, 4 Drawing Figures

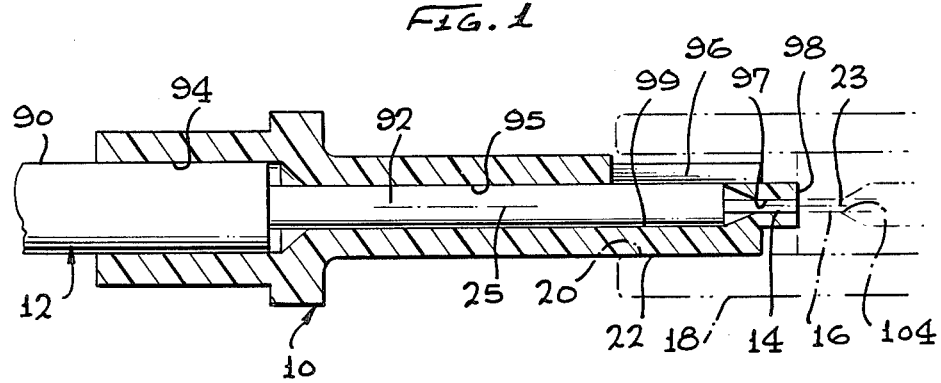
FIG. 1
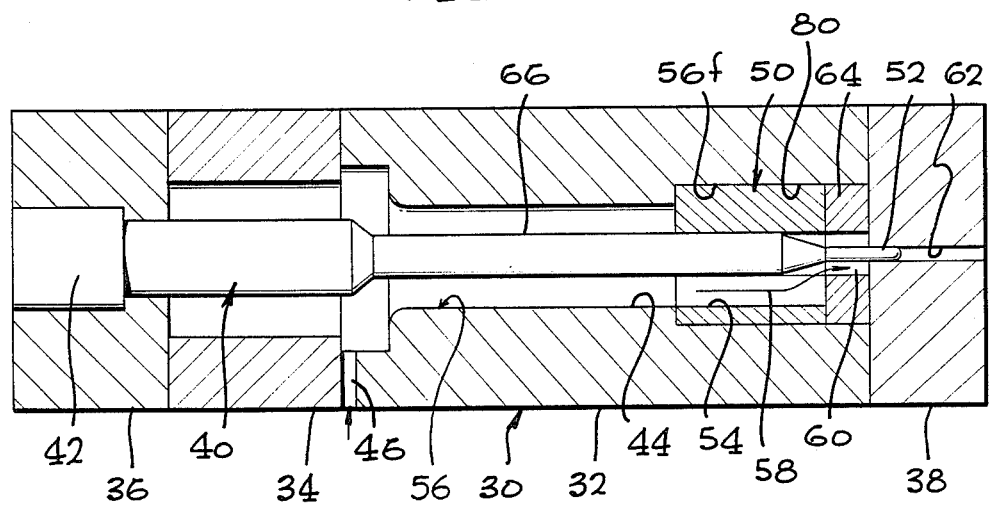
FIG. 3
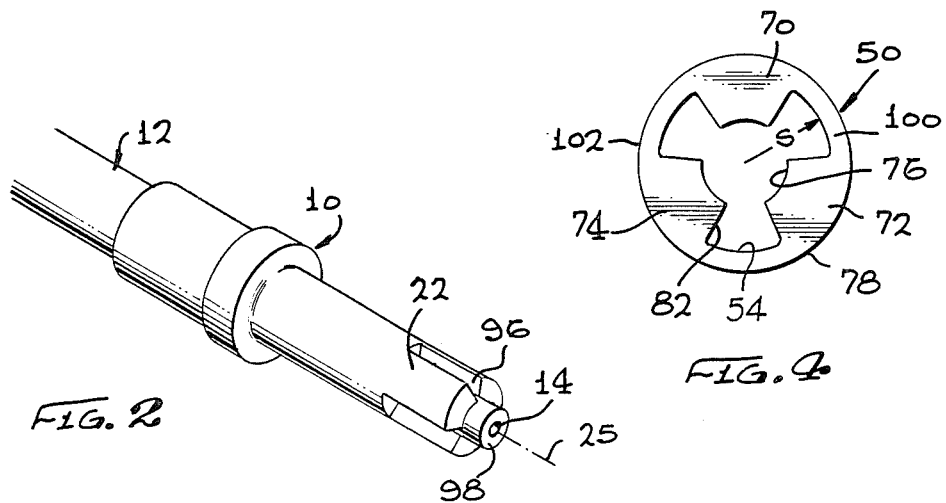
FIG. 2
FIG. 4

METHOD AND APPARATUS FOR MOLDING FIBER OPTIC CONNECTOR FERRULE

BACKGROUND OF THE INVENTION

Optical fibers are often available as cables which include a bare optic fiber at the center, a thin jacket or buffer immediately surrounding the cable, and a thicker outer jacket at the outside. A pair of such cables can be connected together by an arrangement wherein a first cable is mounted within a plug ferrule with the tip of the optic fiber lying at the forward end of the ferrule. The second cable is similarly mounted in a receptacle which receives the plug ferrule so the tips of the optical fibers abut one another. Since the active diameter of the fiber is extremely small, typically 0.002 inch, the radial alignment of the fibers must be held within small tolerances such as a few ten-thousandths of an inch. It is also been found that in typical applications, the ends of the fibers must be aligned within about ½°, in order to attain acceptable light loss levels. Such precision is currently attained by holding the fibers with precision devices such as jewel bushings, precision balls, or rods. While these methods produce acceptable loss levels, they are relatively costly.

Efforts to produce low cost, one-piece precision ferrules by plastic molding have previously not been successful. Molding has been accomplished by the use of a mold forming a cavity that defines the outside of the ferrule, and a core pin for defining the inside of the ferrule, where the optic cable is received. Only the rearward end of the core pin was held, to thereby provide a passageway for molten plastic to reach the extreme forward end of the cavity. It was found that plastic molding pressures against the core pin, particularly on the male ferrule, resulted in axial displacements ranging from 0.0005 inch to 0.001 inch. Although such movements are very small, they produced angular misalignments in the fiber aligning hole of 1.5° to 3°, which is considerably more than the acceptable misalignment angle of about ½°. Apparatus that enabled the molding of precision ferrules, wherein the forward fiber-holding cavity portion was precisely concentric with the cylindrical periphery of the ferrule, would enable the production of precision molded connector elements of relatively low cost.

SUMMARY OF THE INVENTION

In accordance with one embodiment of the present invention, an apparatus is provided for the molding of an optic fiber connector, which produces connectors or ferrules that hold the optic fiber more precisely concentric with the cylindrical surface of the connector which engages a mating connector. In a molding process wherein a core pine which lies within a mold cavity has a rearward end mounted on the mold and a forward end which is not precisely held directly to the mold, an insert or bushing is provided to hold the forward end portion of the core pin precisely concentric with a cylindrical mating surface of the connector. The bushing includes a plurality of radially-extending arms having radially outer ends closely received with a mold cavity and radially inner ends which closely engage the forward end portion of the core pin to hold it precisely concentric with the mating surface of the connector. There are spaces between the arms through which molten plastic can pass during the molding of the connector, to enable plastic to flow forward and form an optic fiber guide that closely receives the optic fiber to hold it in close alignment with the optic fiber of another connector.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a fiber optic connector ferrule, shown with an optic fiber cable installed therein, and showing in phantom lines how it is connected to a female or receptacle connector.

FIG. 2 is a front perspective view of the connector of FIG. 1.

FIG. 3 is a sectional view of apparatus for molding the connector of FIGS. 1 and 2.

FIG. 4 is an end view of the ferrule of the molding apparatus of FIG. 3.

DESCRIPTION OF THE PREFERRED EMBODIMENTS

FIG. 1 illustrates a fiber optic connector or ferrule 10 with an optic fiber cable 12 installed therein, and indicating the manner in which the optical fiber 14 of the cable is optically coupled to another optical fiber 16. The other connector 18 has a cylindrical mating surface 20 which closely receives the interrupted, or slotted, cylindrical outer surface 22 of the ferrule 12 so the two connectors 10, 18 are in alignment. The two optical fibers 14, 16 are then also in alignment, both in radial alignment wherein their extreme ends engage on another over almost the entire areas of their ends, and in axial alginment wherein the axes of the two fibers are substantially parallel. In order to attain acceptable light loss levels, the radial alignment must be within a few ten-thousandths of an inch and the axial alignment must be within about ½°.

Since the position of one optical fiber 14 with respect to the other 16 depends upon the relative positions of the mating surfaces 20, 22 of the two connectors, it is necessary that the axis 23 of the optic fiber 14 be precisely aligned with the axis 25 of the outer surface 22 of the connector. This has been difficult to achieve in the prior art. FIG. 3 illustrates the method by which the ferrule 10 can be molded. A mold 30 includes three sections 32, 34, and 36. A front plate 38 seals the front end of the mold. A mold core pin 40 has a rearward end 42 mounted on the rear section or core pin plate 36 of the mold, and the corepin extends the full length of the mold cavity 44. Molten plastic can be injected through a fill gate 46 to fill most of the region between the core pin and the walls of the mold cavity 44 to form the ferrule.

In prior molding operations, no insert or bushing 50 was employed to support the forward end portion of the core pin. It can be appreciated that the precise radial position and axial orientation of a fiber-corepin portion 52 at the front end of the core pin, with respect to the interrupted cylindrical surface 54 of the ferrule cavity 56, is of great importance in assuring that good connection will be made between two optic fibers. When high plastic molding pressures had been applied against the corepin 40, in the absence of the bushing 50, such high pressures resulted in sideward deflection of the front of the core pin so the reduced-diameter corepin portion 52 became slightly misaligned with the cylindrical surface at 44. The bushing 50, which lies at the forward portion 56f of the mold cavity, holds the front end of the corepin precisely in position despite the high pressures tending to push it to one side, while permitting the substantially free axial flow of molten plastic in the direction of arrow 58, to fill the critical front portion 60 of the ferrule cavity.

It is desireable that the fiber-corepin portion 52 be completely surounded with molding plastic so the finished ferrule completely surrounds the optical fiber 14 (FIG. 1). By using a steel bushing 50 to hold a forward portion of the corepin, but at a location rearward of the reduced-diameter corepin section 52 of the pin, applicant is able to closely align the section 52 with the cylindrical surface 54 which is to form the mating surface of the ferrule. The distance between the forward end of the bushing 50 and the fiber-core section 52 is relatively small so that sideward pressures on the section 52 do not substantially misalignment it. It may be noted that the front plate 38 provides a hole 62 which receives the corepin section 52, but the front plate 38 is not aligned with high precision with the main mold section 52. A spacer ring 64 is provided to position the bushing 50 a distance behind the extreme front end of the ferrule cavity 56, to assure that the bushing 50 surrounds substantially only the larger middle section 66 of the corepin rather than the front portion at 52.

As shown in FIG. 4, the bushing 50 forms three arms 70,72, and 74 whose radially inner ends 76 closely engage the front of the middle section 66 of the core pin, and whose radially outer ends 78 closely engage a wall 80 of the mold cavity, thereby holding the front of the middle core section 66 precisely concentric with the cylindrical surface 54 of the ferrule cavity. The bushing forms three spaces 82 between adjacent arms, through which molten plastic can flow to fill the region 60 which is to closely surround and align an optical fiber. The radially outer ends of the arms are joined by tying portions 100 that, together with the radially-outer ends of the arms, form a ring-shaped outside 102. The radially inner surfaces 54 of the tying portions, of radius S, form the cylindrical mating surface 22 of the ferrule.

The bushing 50 is constructed so its corepin-engaging surface 76 is precisely concentric (within 0.001 inch) with its mating-surface forming surface 54. Of course, the corepin 40 is formed with its two cylindrical sections 66, 52 precisely concentric. It would be possible to eliminate the bushing 50 and use the front plate 38 (or a bushing at the location of the front plate) to hold the corepin. However, the reduced-diameter corepin section 52 would then be likely to bend when large sideward pressures are applied to the middle corepin section 66, resulting in the axis of the corepin section 52 becoming angled by more than about ½° from the axis of the cylindrical surface 54.

The optical fiber cable 12 includes a thick jacket 90, a thin jacket or buffer 92, and the optical fiber 14. In order to install the cable, the thin jacket is removed from the end of the cable, and the thick jacket is removed from a length of cable behind the exposed fiber, to form a stripped cable end. The cable is then pushed through a rear opening 94 in the cable-receiving hole 95 of the ferrule to the position shown in FIG. 1. In that position, the bare optic fiber 14 lies in the smallest-diameter section 97 of the hole, while the buffer 92 lies in a greater diameter section 99 of the hole. The optic fiber 14 can be securely fastened in place with adhesive, by applying the adhesive to the fiber 14 just before it is pushed all the way in, when it lies beside one of the three openings 96 near the front end of the ferrule. The application of the adhesive through an opening 96, helps to avoid depositing of the adhesive in undesired places along the inside of the ferrule. After the cable is installed, the extreme front end 98 of the ferrule with the cable installed, can be lapped flat.

The other receptacle connector 18 can be constructed in a largely similar manner, using a bushing such as 50 to position the hole 104 which holds the bare optic fiber 16 accurately concentric with a mating inner cylindrical surface 20 on the female or receptacle connector.

Thus, the invention provides a method and apparatus for constructing an optical fiber cable connector, which can be molded of plastic, and yet which can hold the bare optical fiber so its axis is closely aligned with the axis of the substantially (interrupted) cylindrical mating surface of the ferrule, such as the outside thereof for the male or plug connector, and the cylindrical inside surface for the female or receptacle connector. This can be accomplished by the use of an insert or ferrule for supporting the forward end of a middle portion of a corepin and radially outer ends which are joined by tying portion having inside surfaces that are precisely concentric with the inner ends of the arms. Spaces are left between the arms through which molten plastic can flow, to completely surround the reduced-diameter forward end of the corepin to form the hole which closely receives the bare optical fiber of a cable.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for forming a fiber optic connector ferrule, comprising:

mounting the rear of an elongated corepin on the rear end of an injection mold which has an elongated mold cavity, so the corepin extends throughout the length of the mold cavity, said corepin having a reduced-diameter forward section of about the same diameter as the bare fiber of an optical fiber cable that is to be held by the ferrule and a middle section rearwardly spaced from the forward end of the corepin and having a greater diameter than said forward section;

installing a bushing which has a ring-shaped outside and at least three radially-inwardly extending arms, within said mold cavity, with the radially inner ends of the arms closely surrounding the front of the middle section of the corepin, and with the inner surface of a group of tying portions of the bushing which connect the radially outer ends of the arms, forming an interrupted cylinder which is precisely concentric with the inner ends of said arms;

injecting a molten plastic into the mold cavity from a location which is rearward of said bushing, and flowing said plastic forwardly through the spaces between the arms of said bushing to form a plastic ferrule; and removing said ferrule from said mold cavity, removing said corepin from said bushing, and removing bushing from around said ferrule.

2. Apparatus for molding a fiber optic connector ferrule so its inside can hold the optic fiber, lying at the forward end of a stripped optical fiber cable, precisely concentric with a substantially cylindrical mating surface near the end of the ferrule, comprising:
- a mold which forms an elongated mold cavity defining most of the periphery of a ferrule, said mold cavity including a largely forward portion;
- an elongated corepin for forming most of the inside of the ferrule, said corepin having a rearward end mounted on said mold and having a substantially cylindrical middle section and a smaller reduced diameter forward section of substantially the same size as an optic fiber; and
- a bushing lying within the forward portion of said mold cavity and surrounding said cylindrical middle section of said corepin, said bushing having a plurality of radially-extending arms that have radially-inner ends that closely surround said corepin and radially outer ends, said radially outer ends lying radially opposite the radially-inner ends where the radially-inner ends closely surround said corepins and said radially outer ends being closely received within said mold, said arms being angularly spaced apart substantially at their radially inner ends to leave gaps through which molding material can flow forwardly to enter the extreme forward portion of said cavity.

3. The apparatus described in claim 2 wherein:
said bushing has tying portions which extend between the radially-outer ends of said arms to join said arms, the radially inner surfaces of said tying portions being precisely concentric with the radially-inner ends of said arms.

4. The apparatus described in claim 2 including:
a spacing ring lying at the extreme forward end of said mold cavity, having a periphery closely received in said mold cavity, and having an inside surface of much larger diameter than said reduced diameter forward section of said corepin and surrounding it;
said bushing lying against the rearward end of said spacing ring, whereby to enable the molded ferrule to completely surround the bare optic fiber of an optic cable.

5. Apparatus for molding a fiber optic connector ferrule so its inside can hold an optic fiber that lies at the forward end of a stripped optical fiber cable, precisely concentric with a substantially cylindrical mating surface near the forward end of the ferrule, comprising:
- a mold which forms an elongated mold cavity defining most of the periphery of a ferrule, said mold cavity including a largely forward portion;
- an elongated corepin for forming most of the inside of the ferrule, said corepin having a rearward end mounted on said mold and having a substantially cylindrical middle section and a smaller reduced diameter forward section of substantially the same size as an optic fiber;
- said mold including a precisely positioned bushing portion closely lying within the forward portion of said mold cavity and closely surrounding said cylindrical middle section of said corepin to hold the middle section against radial deflection, said bushing portion having a plurality of radially-extending arm portions that are spaced to leave gaps through which molding material can flow forwardly to enter the extreme forward end of said cavity.

6. The apparatus described in claim 5 wherein:
said bushing portion comprises a bushing which has tying portions which extend between the radially-outer ends of said arm portions to join them, said typing portions forming interrupted cylindrical radially inner surfaces which are precisely concentric with the surface of said bushing which closely surrounds said corepin.

7. The appartus described in claim 5 wherein:
said forward portion of said mold cavity has a diameter no greater than the cylindrical middle section of the corepin which said bushing portion surrounds, whereby to facilitate removal of the bushing portion.

* * * * *